United States Patent [19]

Linder et al.

[11] 4,018,196

[45] Apr. 19, 1977

[54] INTERNAL COMBUSTION ENGINE

[75] Inventors: Ernst Linder, Muhlacker; Hubert Dettling, Hohenacker, both of Germany

[73] Assignee: Robert Bosch G.m.b.H., Stuttgart, Germany

[22] Filed: Nov. 5, 1975

[21] Appl. No.: 628,904

[52] U.S. Cl. .......... 123/75 B; 123/32 ST; 123/52 M
[51] Int. Cl.² .......... F02B 75/02
[58] Field of Search .......... 123/32 ST, 32 G, 75 B, 123/52 M, DIG. 4

[56] References Cited

UNITED STATES PATENTS

| | | | |
|---|---|---|---|
| 1,584,656 | 5/1926 | Rudkin | 123/75 B |
| 1,834,473 | 12/1931 | Ricardo | 123/75 B |
| 3,014,466 | 12/1961 | Monnot et al. | 123/32 G |
| 3,894,520 | 7/1975 | Clawson | 123/32 ST |

*Primary Examiner*—Wendell E. Burns
*Assistant Examiner*—David D. Reynolds
*Attorney, Agent, or Firm*—Edwin E. Greigg

[57] ABSTRACT

A multicylinder, stratified charge, internal combustion engine in which the main combustion chamber of each cylinder is coupled, through a conduit with controllable flow cross section, to the precombustion chamber of the cylinder which precedes it in the firing order of the engine. A flutter valve controls the flow of gases into each precombustion chamber. Part of the fuel injected just ahead of the main engine inlet valve in the induction tube of each cylinder is thereby drawn off and delivered to the precombustion chamber of the preceding cylinder in the firing order of the engine.

4 Claims, 3 Drawing Figures

→ TO PRECEDING CYLINDER

FROM FOLLOWING CYLINDER

FIRING ORDER
1-3-4-2

INTERNAL COMBUSTION ENGINE

BACKGROUND OF THE INVENTION

The invention relates to a multi-cylinder internal combustion engine including a main combustion chamber located adjacent to the piston and a precombustion chamber connected with the main combustion chamber by a channel. The precombustion chamber includes ignition means as well as an inlet valve for admitting a fuel-air mixture. Another inlet valve admits the appropriate fuel-air mixture to the main combustion chamber.

It is known that an easily ignitable fuel-air mixture must contain ten to fifteen percent fuel and such a mixture then also delivers the highest engine performance. Mixtures which are substantially leaner than that and which would, in principle, be desirable because of the substantially lower concentration of toxic exhaust gases, are ignitable only with greater difficulty. It is for this reason that internal combustion engines having precombustion chambers, so-called stratified-charge engines, have been developed. The precombustion chamber is filled with a relatively rich fuel-air mixture which is then ignited and generates an ignition flame which propagages to the main combustion chamber and leads to the ignition of the somewhat leaner and more difficult to ignite mixture in the main combustion chamber. As a result, the concentration of noxious components in the exhaust is substantially reduced while, at the same time, obtaining a more favorable fuel usage. In the known systems, the fuel is supplied either into the induction tubes associated with the combustion chambers or else directly into the combustion chambers. When direct injection into the combustion chamber is used, considerable injection pressure is required which, in turn, necessitates substantial expense. Furthermore, difficult problems arise regarding the preparation of the fuel-air mixture for direct injection systems. Similar remarks apply to a process in which the main combustion chamber is supplied with a fuel-air mixture through the main engine inlet valve, while fuel is directly injected into the precombustion chamber.

Also known are internal combustion engines of the type generally described above in which the fuel metering for each cylinder is performed in a particular location and a portion of the complete metered-out fuel quantity is then branched off and injected into the precombustion chamber by a separate pump. While this system can dispense with a second fuel metering device for each cylinder which would work synchronously with the first fuel metering device, nevertheless a separate pressurized supply mechanism is required.

OBJECT AND SUMMARY OF THE INVENTION

It is a principal object of the invention to provide an engine of the type described above which requires only a single fuel metering system and which operates without supplementary and expensive fuel supply systems for one of the two combustion chambers.

This object is attained according to the invention by providing a conduit which establishes communication between the space ahead of the main engine inlet valve and the precombustion chamber of the cylinder which precedes it in the firing order. The fuel is supplied in such a manner that prior to the opening stroke of the main engine inlet valve, fuel is supplied to the induction tube ahead of this inlet valve and a portion of this fuel is aspirated into the precombustion chamber of the cylinder which precedes it in the firing order. The supply of fuel ahead of the main engine inlet valve takes place in time so that the suction stroke of the cylinder preceding it in the firing order is able to aspirate the required fuel quantity into its own precombustion chamber. In order to properly utilize the displacement of the operating range of the engine into a generally leaner fuel mixture, it is desirable that the fuel metering system is operated using a so-called running limit control.

In a preferred embodiment of the invention, the emission valve of the precombustion chamber is a flutter valve embodied as plate-or tongue-valve which is opened and closed by the prevailing pressures in the precombustion chamber. Such a flutter valve has a movable valve member of very low mass but controls a relatively large flow cross-section so that a very precise opening and closing characteristic is achieved even up to regions of high r.p.m. The numerous flow apertures of such valves insure that homogeneity of the fuel-air mixture is not diminished and, on the contrary, produce a desired heating and preparation of the fuel-air mixture. The low mass of the valve and the cooling experienced by the aspirated fuel-air mixture insure that the fuel is not overheated and thus does not pre-ignite.

The invention will be better understood as well as further objects and advantages thereof become more apparent from the following detailed description of two preferred although merely exemplary embodiments taken in conjunction with the drawing.

DESCRIPTION OF THE PREFERRED EMBODIMENTS

Figure 1:
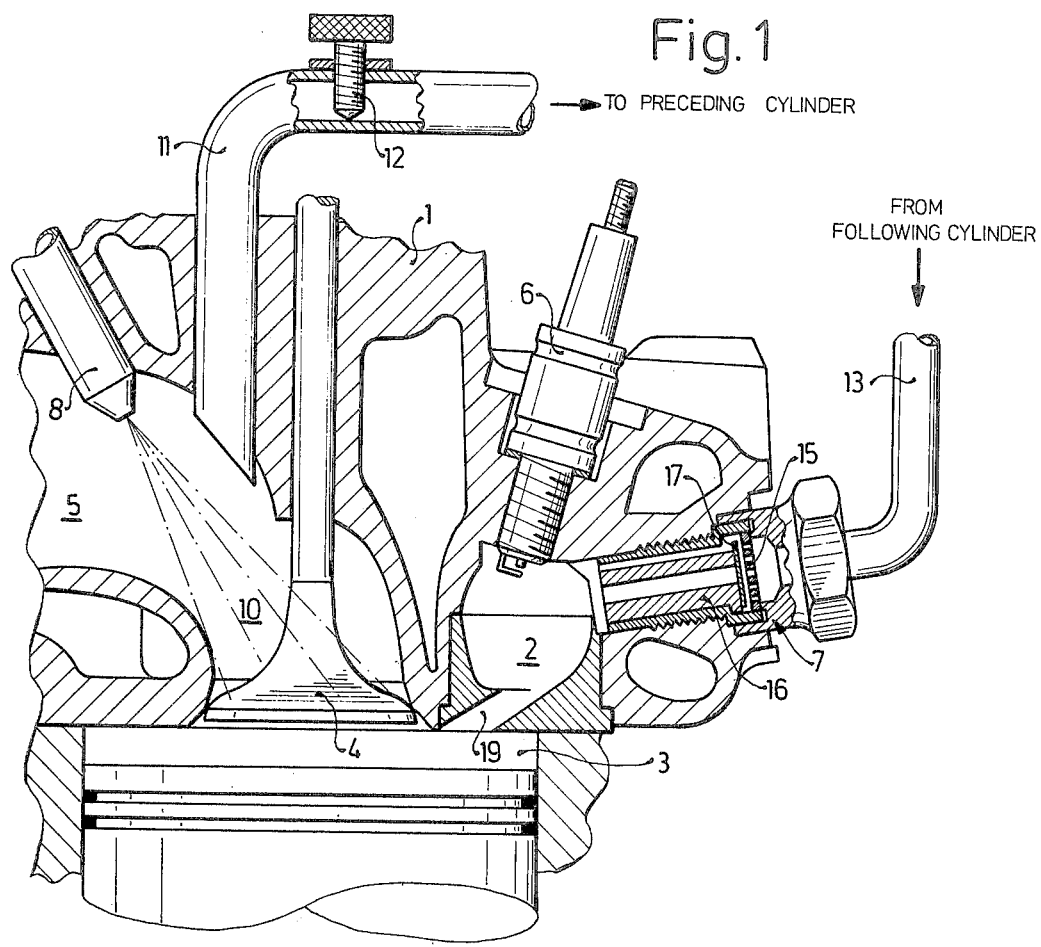
FIG. 1 is a cross section of a cylinder head according to the invention.

Turning now to FIG. 1, there is shown the cylinder head 1 of a stratified-charge engine including a precombustion chamber 2, a main combustion chamber 3, and a main engine inlet valve 4 which controls the flow from an induction tube 5 to the main combustion chamber 3. The precombustion chamber 2 includes a spark plug 6 as well as a flutter valve 7 in addition to an injection nozzle 8 which supplies fuel metered out by a fuel metering system (not shown) into a volume 10 ahead of the engine inlet valve 4. This volume 10 communicates with the precombustion chamber 2 of another cylinder of the engine lying just behind the first cylinder in the firing order, via a suction conduit 11 containing an adjustable throttle mechanism 12. Conversely, the suction conduit 13 terminating in the precombustion chamber 2 would always lead to the induction tube volume 10 of the immediately following cylinder in the firing order of the engine. The flutter valve includes a valve seating plate 15, a valve base 16 and a movable valve member embodied as a disc 17. The precombustion chamber 2 and the main combustion chamber 3 communicate via an ignition channel 19, through which the igniter flame propagates from the precombustion chamber into the main combustion chamber.

Figure 2:
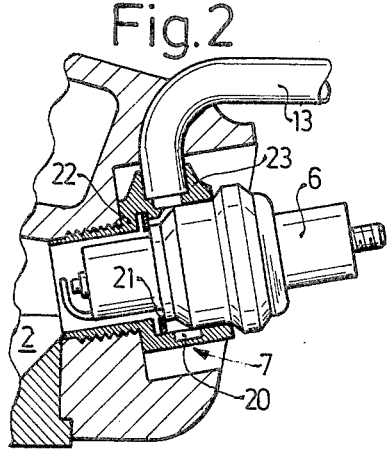
FIG. 2 is a portion of FIG. 1 showing a second embodiment of a precombustion chamber according to the invention.

In the second embodiment of the flutter valve 7 and of the precombustion chamber 2, shown in FIG. 2, the fuel-air mixture flows through the suction line 13 into an annular volume 20 disposed about the spark plug 6 and containing the flutter valve 7. In this case, the movable member of the flutter valve is an annular disc 21 which moves freely in the space between a connection sleeve 22 serving as the valve base and the spark plug holder 23 acting as the valve seat.

Figure 3:
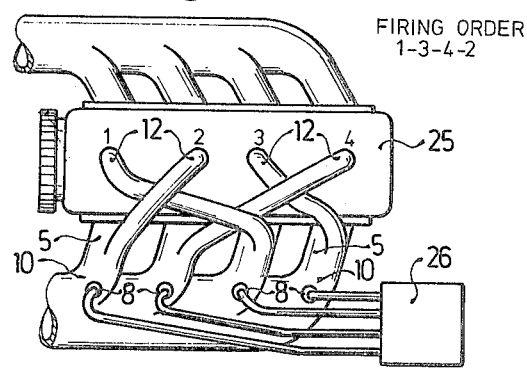
FIG. 3 is a simplified and schematic diagram of an internal combustion engine employing the apparatus according to the invention and showing the connection of the various conduits for a particular firing order.

FIG. 3 is a top view of a four-cylinder internal combustion engine 25 operating with the commonly used firing order 1-3-4-2. The engine cylinders are numbered 1,2,3,4 in small figures. The main combustion chambers receive their fuel-air mixture via the induction tube sections 5 which include nozzles 8 injecting fuel into the volumes 10. Branching off from these volumes 10 are the suction conduits 12. Thus, according to the invention, the induction tube of the engine cylinder 1 would be connected with the pre-chamber of the cylinder 2, the induction tube of the cylinder 2 would be connected with the pre-chamber of the cylinder 4, etc. The fuel is metered out by a fuel metering system 26, including, for example, an injection pump, which injects the fuel into the volumes 10 ahead of the engine inlet valves which are not shown.

The system operates as follows:

The fuel admitted by the injection nozzles 8 into the volumes 10 ahead of the engine inlet valves 4 is injected in dependence of the crankshaft r.p.m. at a point of time which is early enough so that the prechamber of the previous cylinder in the firing order is engaged in its suction cycle and therefore experiences a vacuum which causes a portion of the fuel delivered to the main combustion chamber of the first cylinder to flow through the lines 11 and 13 and the flutter valve 7 into the precombustion chamber 2. Only after this process is the engine valve 4 of the first cylinder opened and the remaining fuel flows from the volume 10 into the main combustion chamber 3 due to the suction taking place in the first cylinder. The amount of mixture flowing to the pre-chamber 2 may be adjusted by the throttle member 12. As soon as the valve 4 has been closed and the corresponding compression stroke in the main combustion chamber 3 is terminated, the spark plug 6 in the precombustion chamber 2 ignites the rich mixture contained therein and an igniter flame travels through the channel 19 and ignites the relatively lean fuel-air mixture contained in the main combustion chamber 3.

What is claimed is:

1. An internal combustion engine including a plurality of cylinders each of which has an induction tube region and an engine inlet valve located therein, and each of which defines a main combustion chamber and a precombustion chamber, said precombustion chamber including ignition means and a secondary inlet valve, the improvement comprising:
   A. a conduit leading from the induction tube region of one cylinder to the precombustion chamber of another cylinder immediately preceding said one cylinder in the firing order of the engine; whereby a portion of the fuel delivered to the induction tube region of said one cylinder is aspirated by said other cylinder and transported into the precombustion chamber thereof.

2. An internal combustion engine as claimed in claim 1, wherein said conduit includes flow cross section control means.

3. An internal combustion engine as claimed in claim 1, wherein said secondary inlet valve is a flutter valve with a plate-like movable valve closure member, said flutter valve being actuated by the pressure prevailing in said precombustion chamber.

4. An internal combustion engine as claimed in claim 1, the improvement further comprising a fuel injection nozzle, located in each of said induction tube regions, for injecting fuel into said region upstream of said engine inlet valve.

* * * * *